United States Patent [19]

Moore

[11] Patent Number: 4,734,147
[45] Date of Patent: Mar. 29, 1988

[54] METHOD FOR MAKING A SURFACE MOUNTED TRIM PIECE

[75] Inventor: Ronald D. Moore, Grosse Pointe, Mich.

[73] Assignee: Chivas Products Limited, Sterling Heights, Mich.

[21] Appl. No.: 870,288

[22] Filed: May 21, 1986

Related U.S. Application Data

[60] Continuation of Ser. No. 520,941, Aug. 8, 1983, abandoned, which is a division of Ser. No. 268,794, Jun. 1, 1981, Pat. No. 4,411,944.

[51] Int. Cl.$^4$ .............................................. B29C 53/04
[52] U.S. Cl. .................................. 156/212; 156/267; 156/273.7; 156/274.4; 156/275.1; 156/308.4; 264/248; 264/257
[58] Field of Search ............................. 156/212–214, 156/209, 219, 220, 250–251, 267, 272.2, 274.4, 273.7, 225.1, 288, 274.4, 379.6, 379.8, 308.2, 380.3, 308.4, 380.5, 380.6, 581, 380.1, 515, 580.1, 228, 245, 212, 213; 264/248, 163, 257, 153

[56] References Cited

U.S. PATENT DOCUMENTS

| | | | |
|---|---|---|---|
| 2,153,351 | 4/1939 | Steinberger | 156/515 |
| 3,234,064 | 2/1966 | Smith | 156/222 |
| 3,244,571 | 4/1966 | Weisman | 156/275.1 |
| 3,466,214 | 9/1969 | Polk et al. | 156/267 |
| 3,528,872 | 9/1970 | Scholl | 156/274.4 |
| 3,655,477 | 4/1972 | Scholl et al. | 156/202 |
| 3,701,707 | 10/1972 | Scholl | 156/380.5 |
| 3,833,439 | 9/1974 | Smith | 156/219 |
| 3,849,225 | 11/1974 | Haertle | 156/213 |
| 3,966,526 | 6/1976 | Doerfling | 156/267 |
| 4,191,606 | 3/1980 | Evans | 156/538 |
| 4,247,350 | 1/1981 | McIntyre et al. | 156/216 |
| 4,328,067 | 5/1982 | Cesano | 156/267 |

FOREIGN PATENT DOCUMENTS 0032669 1/1980 Japan .................................. 156/251

Primary Examiner—Merrell C. Cashion, Jr.
Attorney, Agent, or Firm—Townsend and Townsend

[57] ABSTRACT

A trim piece for mounting to an interior panel of an automobile having a relatively rigid support member, foam padding, and an outer cover of vinyl or cloth. The cover and the foam padding are dielectrically bonded to the relatively rigid support member contiguous the edges of the trim member without enveloping the edges of the support member to provide a trim piece which mates with the surface of the interior panel. The method for making the trim piece involves using a dielectric die which defines an acute angle between an upper and lower die half, the acute angle being contiguous with the edge of the trim piece and being oblique with respect to the movement of the die halves. The lower die half mates with the support member and the upper die half mates with the vinyl cover at the points of dielectric bonding.

8 Claims, 10 Drawing Figures

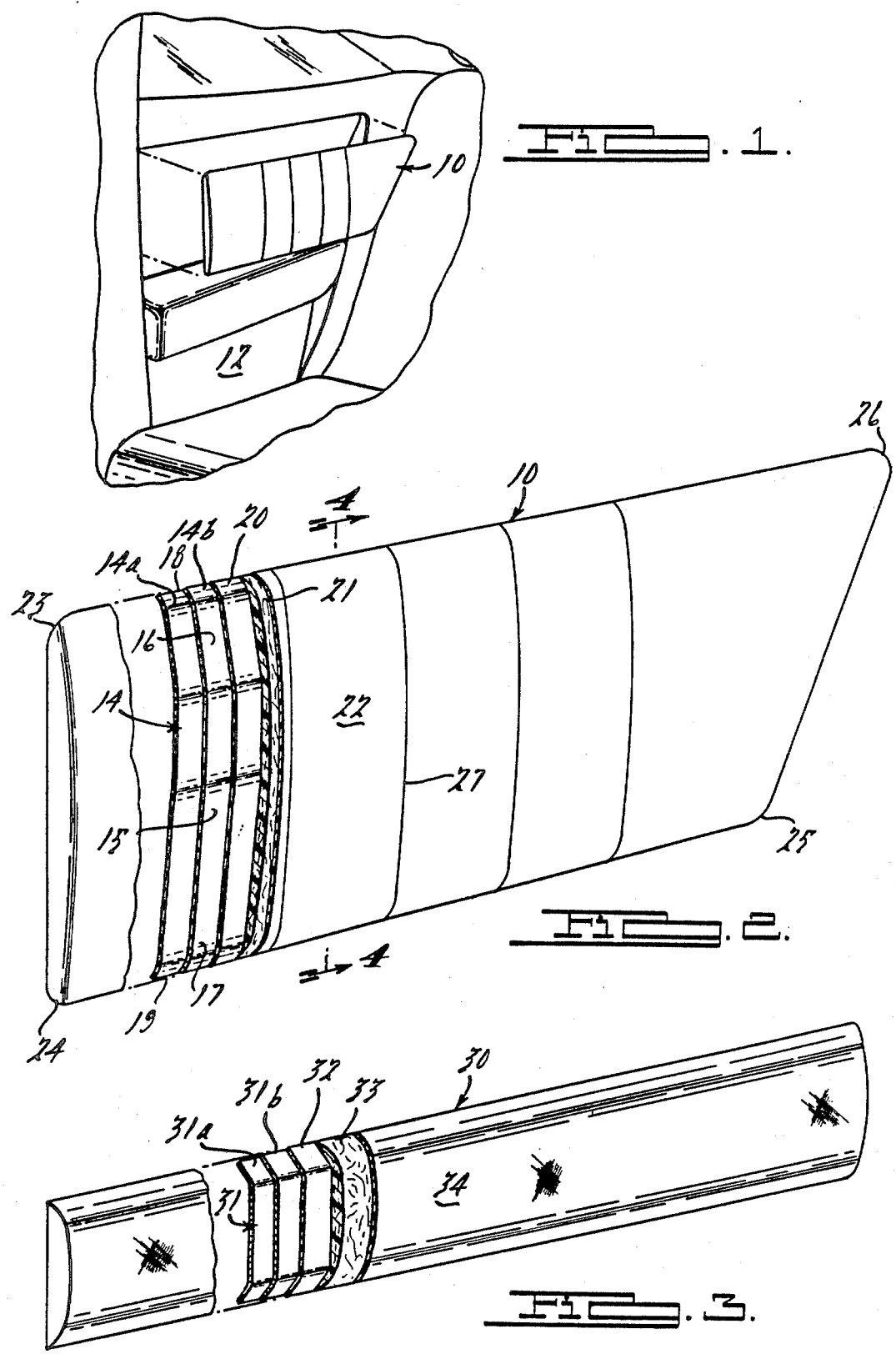

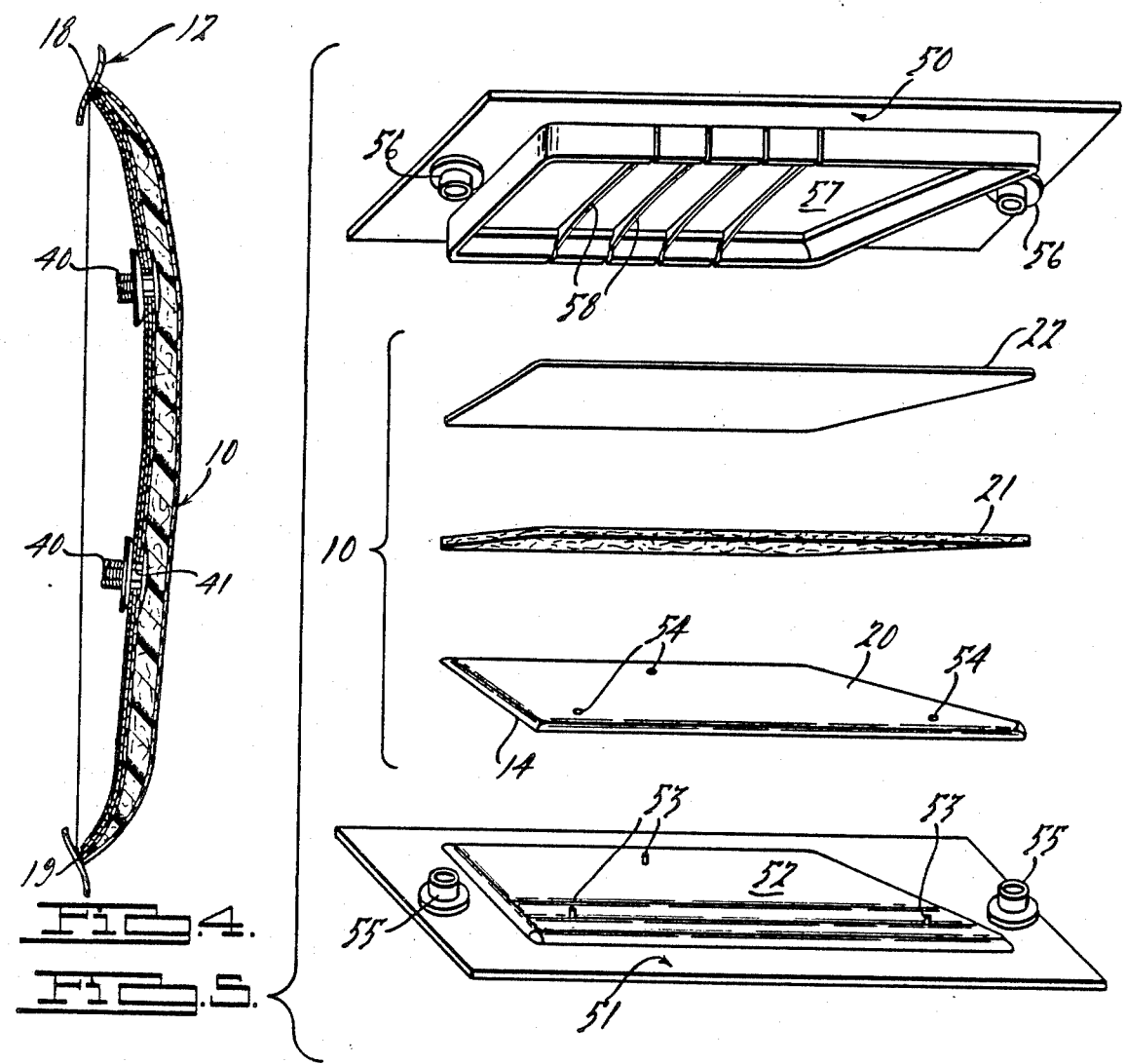
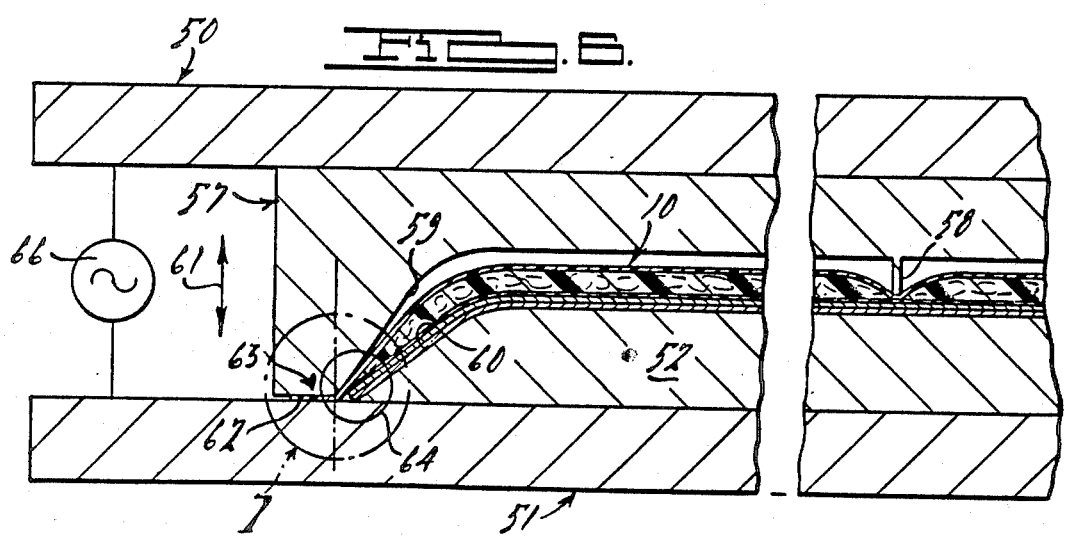

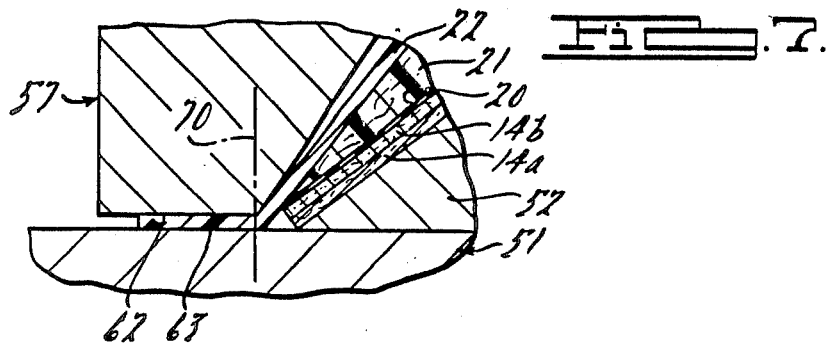
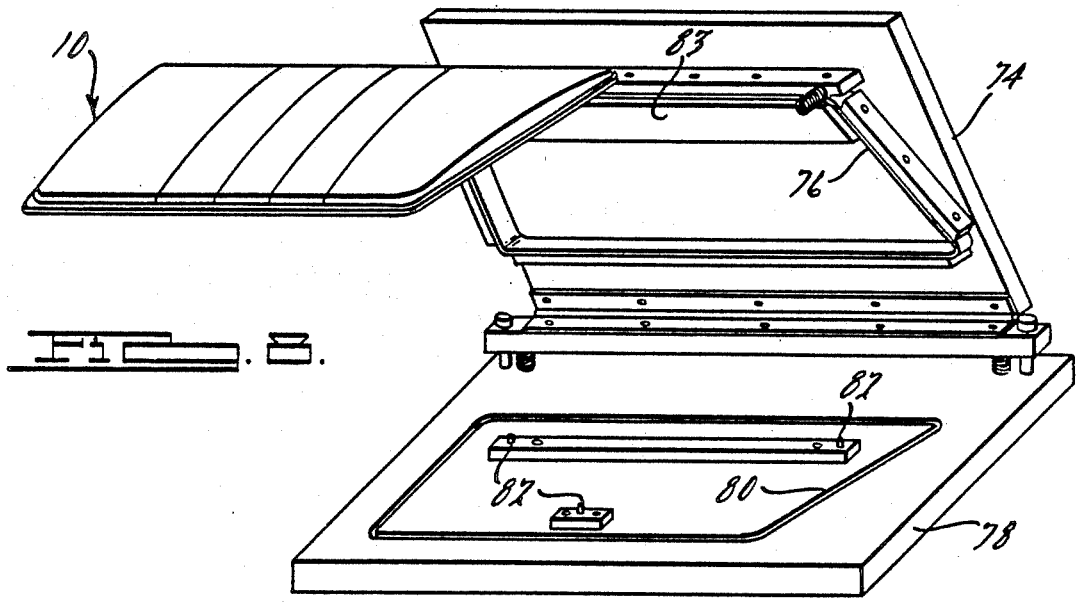
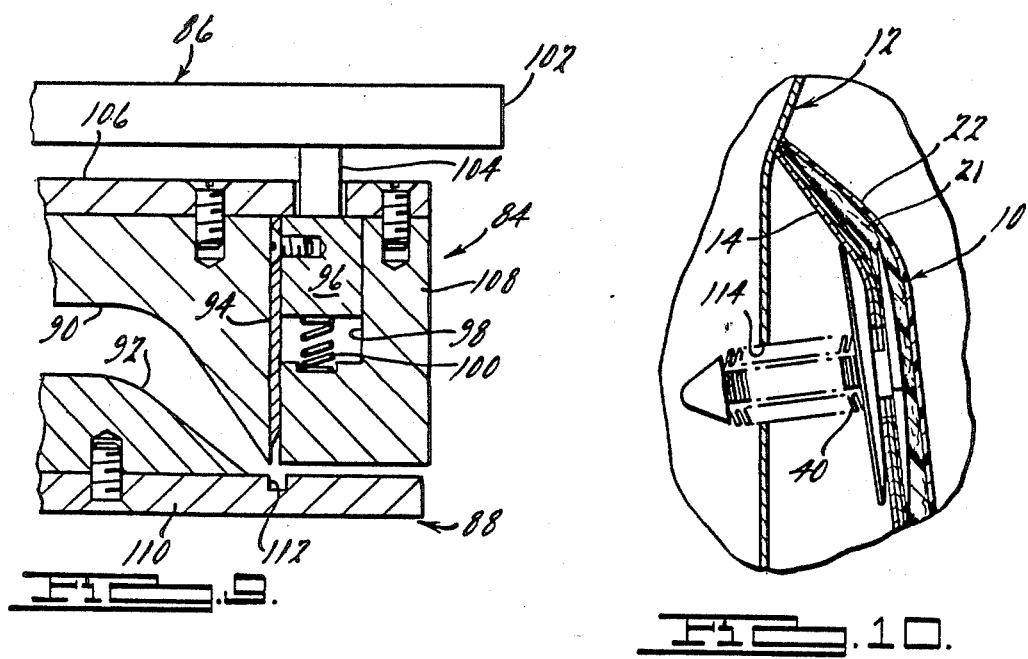

METHOD FOR MAKING A SURFACE MOUNTED TRIM PIECE

This is a continuation of application Ser. No. 520,941, filed Aug. 8, 1983 and now abandoned, which is a division of application Ser. No. 268,794, filed June 1, 1981, now U.S. Pat. No. 4,411,944.

BACKGROUND AND SUMMARY OF THE INVENTION

In recent years large interior panels for automobiles have been molded in one piece out of a homogenous plastic material. These plastic interior panels have the advantage of being of low cost and weight and have a reasonably attractive appearance. However, since they are molded of a homogenous plastic material, they have a somewhat bland and austere appearance which is unsuitable for higher-price luxury automobiles. For use in luxury automobiles, trim features such as padded trim pieces are added to the molded interior panels to provide a luxurious appearance and feel. Padded trim pieces are made generally of a relatively rigid support member comprised of pressboard or the like, a foam pad and a vinyl covering for the foam.

In a known method of making padded trim pieces, the vinyl covering is wrapped around the edges of the trim piece and secured to the inside of the support member by gluing. Since the vinyl is wrapped about the edges of the trim piece, however, the vinyl tends to bunch at the corners of the trim piece. This bunching, of course, is unsightly. More importantly, this bunching results in an increased material thickness at the corners of the trim piece. Consequently, when the trim piece is mounted to the interior panel, the bunched material prevents a close mating between the edges of the trim piece intermediate the corners and the interior panel, resulting in unsightly gaps between the intermediate edges and the interior panel. Such unsightly gaps are, of course, antagonistic to a luxurious appearance. Also, gaps act as dirt traps and make cleaning difficult.

The present invention provides an improved interior trim piece consisting of a relatively rigid support member such as pressboard or the like, a foam or fibrous pad, and a vinyl or cloth cover which is secured to the support member in a fashion to avoid bunching at the corners of the trim piece. In accordance with this invention, the cover and the foam pad are constructed in a manner so that the edges of the trim piece mate nearly perfectly with the interior trim panel to provide a very attractive finished appearance with no gaps between the edges of the trim piece and the interior trim panel. In addition, this invention provides a trim piece which is capable of standing up to normal abuse without separation of the cover, pad and support member.

The improved trim piece of this invention is manufactured by a novel bonding method that utilized dielectric, ultrasonic, or any other suitable bonding process, wherein the upper and lower surfaces of the bonding die form an acute angle proximate the edge of the trim piece and wherein said acute angle is obliquely disposed with respect to the motion of the upper and lower surfaces of the bonding die. The acute angle causes die convergence near the edge of the trim piece to provide a very secure bond between the cover, the pad, and the support member adjacent the edges of the trim piece. Because of the secure bond, the cover can be trimmed in a fashion which provides optimum mating with the interior panel to provide a finished appearance.

Other features and advantages of this invention will be apparent from the following description of the invention.

BRIEF DESCRIPTION OF THE DRAWINGS

FIG. 1 is a perspective view of an interior panel of an automobile illustrating a typical relationship of a trim piece of this invention to the interior panel of the automobile;

FIG. 2 is a perspective view, partially cutaway, of a trim piece according to the present invention illustrating the component parts thereof;

FIG. 3 is a perspective view, partially cut-away, of an alternative embodiment of a trim piece according to the present invention illustrating the component parts thereof;

FIG. 4 is a cross-sectional view of the trim piece of FIG. 2 mounted on an interior trim panel of an automobile;

FIG. 5 is an exploded view of the trim piece of FIG. 2 showing the components thereof in relationship to a pair of dielectric molding halves;

FIG. 6 is a cross-sectional view, broken away, showing the trim piece of FIG. 2 in a dielectric die for dielectrically bonding the vinyl cover and the foam pad to the support member;

FIG. 7 is an enlarged cross-sectional view of the portion of FIG. 6 indicated by the numeral 7, illustrating the angular relationship of the dielectric die surfaces contiguous the edges of the trim piece and the relationship of the edges of the cover and the edges of the support member and pad of the trim piece;

FIG. 8 is a perspective view of the trim piece of FIG. 2 and of a cutting die for trimming flashing from the trim piece after dielectric bonding;

FIG. 9 is a cross-sectional view, broken away, of an embodiment of a dielectric bonding and trimming machine; and FIG. 10 is an enlarged cross-sectional view, broken away, of the trim piece of FIG. 2 mounted to an interior panel of an automobile and showing the relationship of the edge of the trim piece to the interior panel.

DETAILED DESCRIPTION OF THE PREFERRED EMBODIMENTS

Now referring to the figures, in FIG. 1, a portion of an interior of an automobile is illustrated showing a trim piece 10 according to the present invention and an interior panel 12. Interior panel 12 is a conventional large molded sheet of homogenous plastic material which is contoured to provide various interior features such as elbow rests and the like. Such interior panels are light in weight and are relatively inexpensive to produce. Additionally, they are reasonably attractive in appearance and easy to maintain. It has been found, however, that they are not sufficiently luxurious in appearance and feel to be appropriate for luxury automobiles. To meet the expectations of purchasers of luxury automobiles, it is necessary to add trim pieces which improve the appearance and feel of the interior panel. Trim piece 10 of the present invention is an improved trim piece which is well adapted to enhance the appearance and feel of interior panel 12.

As can be seen in FIG. 2, trim piece 10 has a relatively rigid support member 14 comprising two layers 14a and 14b of pressboard. Alternatively, support member 14 can be molded plastic, metal or other suitable material. Support member 14 defines a contoured shape comprising a generally planar portion 15 and curved side portions 16 and 17 terminating in respective edges 18 and 19. The support member 14 has a plastic coating 20 which facilitates dielectric bonding as will be explained hereinafter. Trim piece 10 further includes a foam or fibrous pad or cushion 21 and a flexible outer cover 22 which can be manufactured from vinyl, cloth, or any other suitable material. Trim piece 10 has a plurality of corners, including right-angular corners 23 and 24, oblique corner 25 and acute corner 26. The trim piece 10 may have various decorative and functional relief lines formed therein such as decorative lines 27.

In FIG. 3, an alternative embodiment of an elongated trim panel 30 according to the present invention is illustrated. The trim panel 30 has a pressboard support member 31 comprising layers 31a and 31b. Similarly to the previous embodiment, the support member 31 has a plastic coating 32 to facilitate the dielectric bonding process. The trim panel 30 also has a foam pad 33 and flexible outer cover 34. Flexible outer cover 34 comprises a cloth material which is either itself suitble for dielectric bonding or has an undercoating which facilitates dielectric bonding.

Now referring to FIG. 4, a cross-sectional view of trim piece 10 mounted to interior panel 12 is illustrated. Trim piece 10 is attached to panel 12 by means of fasteners 40 which extend through aligned openings 41 in support member 14 and plastic coating 20 and project into interior panel 12. Edges 18 and 19 of trim piece 10 closely mate with the interior panel 12 to provide a neat finished appearance as will be better described hereinafter. Note that the trim piece 10 is amply padded substantially throughout so as to provide a luxurious feel as well as a luxurious appearance.

Now referring to FIGS. 5, 6, 7, and 8, the novel process for manufacturing trim strip 10 is illustrated. FIG. 5 shows an exploded view of the component parts of trim piece 10 between dielectric die halves 50 and 51. Before dielectric bonding, support member 14 is shaped or molded by any conventional process to the desired final form and coated with plastic layer 20. Foam padding 21 is sized slightly smaller than support member 14 and vinyl cover 22 is oversized with respect to support member 14. Alternatively, foam padding 21 can also be slightly oversized in relation to support member 14.

In carrying out the bonding process, the pressboard support member 14 is placed upon lower die half 51 which is provided with a formed die portion 52 that is configured to closely mate with support member 14. Die portion 52 has three alignment pegs 53 which serve to properly position support member 14 upon die portion 52. The three alignment pegs 53 are received by correlative alignment openings 54 in support member 14. Foam padding 21 is laid over support member 14 and vinyl cover 22 is in turn laid over the foam padding. When support member 14, foam padding 21, and vinyl cover 22 are in proper position, upper die half 50 of the dielectric die is brought into position by a suitable press. To insure proper alignment of die halves 50 and 51, two alignment pins 55 on lower die half 51 and two alignment sleeves 56 on upper die half 50 are provided. Upper die half 50 is provided with an upper formed die portion 57 which registers with lower formed die portion 52. Additionally, upper formed die portion 57 contains a plurality of ribs 58 for providing relief features on trim piece 10. However, while upper formed die portion 57 registers with lower formed die portion 52, upper formed die portion 57 only contacts trim piece 10 where dielectric bonding is to be effected.

The novel dielectric bonding process of this invention is illustrated in the cross-sectional view of FIG. 6. In FIG. 6, upper formed die portion 57 has a surface 60 on lower formed die portion 52. Surfaces 59, and 60, and the acute angle formed thereby, are obliquely disposed with respect to the relative direction of travel of die halves 50 and 51, such direction being indicated by arrow 61. Upper formed die portion 57 has a lower flashing surface 62 which is perpendicular to the direction of travel 61 and which forms a flashing 63 of trim piece 10.

In prior art dielectric bonding processes, a surface correlative to flashing surface 62 effected the functional dielectric bond of the vinyl cover to the support member. In the novel process of this invention, flashing surface 62 does no more than form or spread the flashing material as described below. The functional dielectric bond is provided in part by surfaces 59 and 60 in a zone 64 which is adjacent, i.e., at and near, the edge of the trim piece 10 as subsequently trimmed. In this manner, the dielectric bond is formed at the edge of trim piece 10 and sufficiently back from the edge towards trim piece 10 to give a functional bond sufficient for automobile or other such similar usage. Once the die halves 50 and 51 are brought together under pressure to compress the components of trim piece 10 as illustrated in FIG. 6, radio-frequency energy from a source schematically illustrated at 66 is passed between formed die portions 52 and 57 to heat vinyl cover 22, foam pad 21, and plastic coating 20 to provide the functional dielectric bond in zone 64, and at ribs 58.

To better illustrate the relationship of the surfaces 59 and 60 near zone 64, an enlarged view thereof is provided in FIG. 7 which is taken from the portion of FIG. 6 encircled by dashed lines "7". In FIG. 7, it can be seen how the foam padding 21 and vinyl cover 22 are compressed in zone 64 to provide a near-solid mass near the edge of trim piece 10 as subsequently trimmed. When practicing the present invention according to the preferred embodiment, foam padding 21 is sized to stop short of the edge of support member 14. Therefore, vinyl cover 21 extends outwardly alone between lower formed die portion 52 and flashing surface 62 to form flashing 63. If, according to an alternative embodiment, foam padding is sized to extend beyond the edge of support member 14, foam padding 21 along with vinyl cover 22 will extend outwardly as a near-solid mass of material between lower formed die portion 52 and flashing surface 62 to form flashing 63. In a subsequent step that will be more fully described, flashing 63 is sheared or trimmed along dashed line 70 to provide a clean finished edge. The edge of support member 14 generally lies contiguous, i.e., at or near, the sheared or finished edge of trim piece 10 such that support member 14 lies slightly inwardly of the sheared edge and vinyl cover 22 extends outwardly of the sheared edge. In this way, a smooth single layer at the finished edge of trim piece 10 is provided having substantially the contour of support member 14.

As shown in FIG. 8, the shearing of flashing 63 occurs in a fixture that has an upper shearing half 74 provided with knife edges 76 and a lower shearing half 78 provided with shearing slots 80. Knife edges 76 are precisely mounted to define the finished or sheared edges of trim piece 10. Knife edges 76 define the finished edges of trim piece 10 slightly outwardly of the preformed edges of the support member 14. The finished edges of trim piece 10 are thus formed so that the edges of vinyl cover 22 extend slightly beyond the edges of support member 14 thereby providing a smooth finished appearance when the edges of the completed trim piece 10 mate with the surface of interior panel 12. Shearing slots 80 are positioned in registration with knife edges 76 to provide a vertically clean shear of flashing material 63 from trim piece 10. Lower shearing half 78 of the shearing fixture is provided with three locating pins 82 which mate with the previously described openings 54 in support member 14. Once trim piece 10 with flashing 63 is placed on lower shearing half 78 of the shearing fixture, with locating pins 82 residing in openings 54 of support member 14, upper shearing half 74 is rotatably downwardly. The shearing function is thereafter accomplished by compressing the shearing fixture in a suitable press. In this manner, flashing 63 is removed from trim piece 10 and a shear along line 70 is efficiently and cleanly accomplished.

FIG. 9 illustrates an embodiment of a machine that is constructed to accomplish both dielectric bonding and shearing in a single fixture 84. Fixture 84 has an upper fixture half 86 and a lower fixture half 88. Upper fixture half 86 includes an upper dielectric die portion 90 while lower fixture half 88 includes a lower dielectric die portion 92. Upper fixture half 86 also includes a shearing knife 94 which is mounted on a shearing knife block 96. Shearing knife block 96 is disposed for up and down sliding movement within a cavity 98 and is biased upwardly by a plurality of compression springs 100. A press plate 102 having press pins 104 engage the upper surface of shearing knife block 96. Upper fixture half 86 also includes an upper joining plate 106 which is secured to upper dielectric die portion 90 and an upper fixture frame 108 by suitable fasteners as shown. The frame 108 defines cavity 98 for the shearing knife block 96.

Lower fixture half 88 is provided with a lower joining plate 110 having shearing slots 112 which are positioned in registration with the edges of shearing knives 94. Lower joining plate 110 is secured to lower dielectric die portion 92 by suitable fasteners as shown. Lower dielectric die portion 92 is essentially of the same configuration as lower formed die portion 52 depicted in FIG. 6 whereas upper dielectric die portion 90 is of essentially the same configuration as upper formed die portion 57.

In the use of dielectric bonding and shearing fixture 84, support member 14, foam padding 21, and vinyl cover 22 are placed upon lower dielectric die portion 92 and properly positioned by locating pins 82 and openings 54. Upper fixture half 86 is thenafter brought into position by a suitable press and a first predetermined magnitude of pressure is brought to bear across fixture 84. This first predetermined pressure is of a magnitude sufficient to cause dielectric bonding contiguous the edges of trim piece 10 as previously described when an appropriate amount of radio-frequency energy is provided to upper and lower dielectric die portions 90 and 92. This first predetermined pressure is also of a magnitude that only partially compresses springs 100, i.e., a degree of compression which does not cause shearing of the trim piece flashing by shear knife 94. When the dielectric bond is complete, the pressure brought to bear across fixture 84 by the press is raised to a second predetermined level or magnitude which is then sufficient to further compress springs 100 and move shearing knife 94 into shearing slot 112 to shear the flashing from trim piece 10. Thereafter, upper fixture half 86 is lifted from lower fixture half 88 and the completed trim piece 10 is removed.

With the reference now to FIG. 10, the relationship of trim piece 10 to interior panel 12 is illustrated. Fasteners 40 are shown engaging openings 114 in interior panel 12. It can be seen that the edge of vinyl cover 22 is in intimate contact with the surface of interior panel 12. This intimate contact is facilitated by the clean shear previously described. This intimate contact is also facilitated by the fact that the edge of support member 14 terminates slightly inwardly of the edge of vinyl cover 22. Vinyl cover 22, being relatively yieldable beyond where it is supported by support member 14, yields slightly to make the finished-appearance engagement with interior panel 12.

While it is apparent that the preferred embodiments of the invention disclosed are well calculated to provide the advantages and features stated, it will be appreciated that the invention is susceptible to modification, variation, and change without departing from the proper scope or fair meaning of the subjoined claims.

What is claimed is:

1. A method for making a trim piece assembly for attachment to a vehicle surface comprising a contoured support member having a contoured shape including a central portion and side portions extending to said vehicle surface at an acute angle and terminating at an edge, a pad, and a flexible covering, comprising the steps of:

selecting a die having upper and lower die halves;

placing said pad and said cover upon said support member and between the die halves so that said pad is disposed intermediate said cover and said support member and so that said cover extends at least slightly outwardly of said edge;

compressing, between the upper and lower die halves, said assembly of said support member, pad, and cover at said side portions adjacent said edge;

applying heat energy to the face of said side portions adjacent said edge for effecting a bond between said cover and said face side of said side portions contiguous to said edge but leaving a portion of the cover extending at least slightly outwardly of said edge with such outwardly extending portion of said cover not being bonded to said support member;

the die selecting step being carried out by selecting a die in which said lower die half has a first formed die portion which closely mates with said side portions of said contoured support member and said upper die half has a second formed die portion defining an acute angle with the first formed die portion so the second formed die portion only contacts said cover adjacent the edge of the support member where said bond is effected; and trimming said cover contiguous and slightly beyond said edge without enveloping said edge so that, upon attachment of said trim piece to said surface, said outwardly extending unbonded portion of said cover engages said surface substantially at the termination of said cover.

2. A method according to claim 1, wherein one die half has at least one alignment pin and the other die half has a corresponding alignment sleeve to assure alignment of said die halves.

3. A method according to claim 1, wherein said edge of said assembly is compressed between said upper and lower die halves by applying a substantially vertical force to said upper and lower die halves.

4. A method according to claim 1, wherein said pad has a pad edge which is sized to end inwardly of said edge of said support member.

5. A method according to claim 1, wherein said heat energy is passed from a source between said upper and lower die halves to heat said assembly and provide a functional dielectric bond on said face adjacent said edge of said support member.

6. A method according to claim 1, wherein said heat energy is of a radio-frequency energy type.

7. A method according to claim 1, wherein one die half has at least one alignment peg, said alignment peg being received by a correlative alignment opening in said support member.

8. A method according to claim 1, wherein said terminating is accomplished in a fixture having an upper half with knife edges mounted to define said finished edge of said trim piece and a lower half with shearing slots positioned in registration with said knife edges to provide a vertical shear of said flashing material from said trim piece.

* * * * *